(12) United States Patent
Lee et al.

(10) Patent No.: US 8,406,174 B2
(45) Date of Patent: Mar. 26, 2013

(54) METHOD FOR PRUNING PERIMETER WALKS IN DATA-CENTRIC STORAGE SENSOR NETWORKS

(75) Inventors: Young Hee Lee, Daejeon (KR); Xuan Tung Hoang, Daejeon (KR); Dohyun Kim, Daejeon (KR)

(73) Assignee: Lorea Advanced Institute of Science and Technology, Daejeon (KR)

( * ) Notice: Subject to any disclaimer, the term of this patent is extended or adjusted under 35 U.S.C. 154(b) by 453 days.

(21) Appl. No.: 12/694,583

(22) Filed: Jan. 27, 2010

(65) Prior Publication Data
US 2011/0182233 A1    Jul. 28, 2011

(51) Int. Cl.
*H04W 4/00* (2009.01)
(52) U.S. Cl. ........ 370/328; 370/235; 370/392; 455/445; 455/447
(58) Field of Classification Search ........................ None
See application file for complete search history.

(56) References Cited

U.S. PATENT DOCUMENTS

| 7,532,623 | B2* | 5/2009 | Rosenzweig et al. | 370/390 |
|---|---|---|---|---|
| 7,752,332 | B2* | 7/2010 | Jiang et al. | 709/238 |
| 7,812,718 | B1* | 10/2010 | Chan et al. | 340/539.13 |
| 8,085,792 | B1* | 12/2011 | Aly | 370/400 |
| 2010/0172258 | A1* | 7/2010 | Yang et al. | 370/252 |

OTHER PUBLICATIONS

B. Karp, H. Kung, GPSR: Greedy Perimeter Stateless Routing for Wireless Networks, pp. 243-254, Aug. 2000.*
"Perimeter Walks of Geographic Routing in Data-Centric Sensor Networks", XuanTung Hoang, Doctoral Thesis of Korea Advanced Institute of Science and Technology, Nov. 2009.
"An Efficient Scheme for Reducing Overhead in Data-Centric Storage Networks", XuanTung Hoang et al., IEEE Communications Letters, vol. 13, No. 12, Dec. 2009.

* cited by examiner

*Primary Examiner* — Ian N Moore
*Assistant Examiner* — Brian T Le
(74) *Attorney, Agent, or Firm* — Bacon & Thomas, PLLC

(57) ABSTRACT

A method for pruning perimeter walks includes: hashing a name or attributes of an event, when the event occurs, to figure out a destination location of the event; performing greedy forwarding of geographic routing so as to send a packet of the event towards the destination location; checking a distance D between the destination location and a current node where a packet transmission using greedy forwarding mode is impossible, when the packet reaches the current node; checking distances between the destination location and respective neighboring nodes of the current node to obtain a neighboring node having a minimum distance M, when the distance D between the current node and the destination location is same or less than half of radio transmission range; comparing the minimum distance M to the distance D; and determining which node is a rendezvous node, according to the comparison result.

7 Claims, 6 Drawing Sheets

FIG. 6

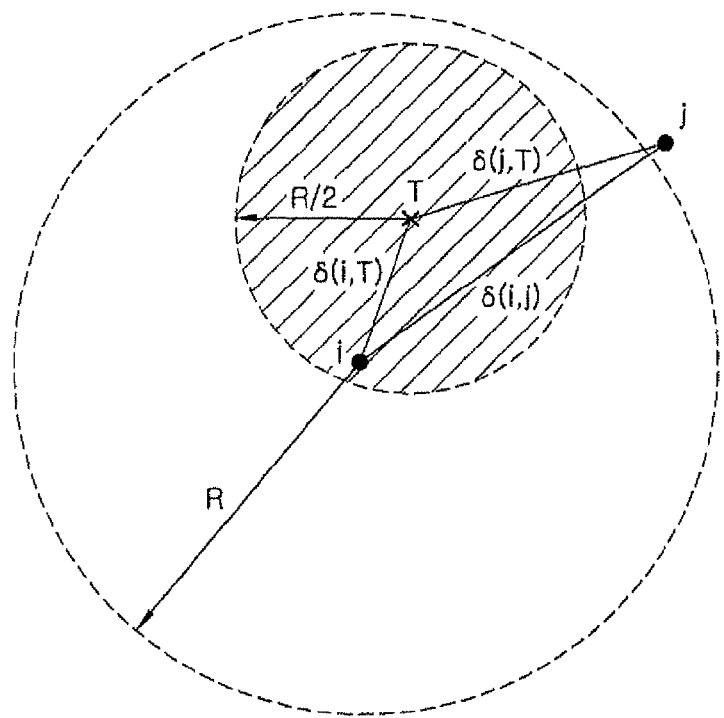

FIG. 7

```
PRUNE PERIMETER WALK (i,T)
comment:
        i : the current node
        T : destination location
        N_i : Set of neighbor of i
```
On receiving a packet to T
if $\delta(i,T) \leq R/2$ then $\begin{cases} j_0 \leftarrow \text{argmin } \delta(j,T) \\ \quad\quad j \in N_i \\ \text{if } \delta(j_0,T) > \delta(i,T) \\ \quad\text{then i Prune perimeter walk} \\ \quad\text{else i forwards the packet to } j_0 \end{cases}$ else i invokes GPSR routing to forward the packet

METHOD FOR PRUNING PERIMETER WALKS IN DATA-CENTRIC STORAGE SENSOR NETWORKS

FIELD OF THE INVENTION

The present invention relates to a method for reducing overhead in data-centric storage sensor networks, and, more particularly, to a method for pruning perimeter walks occurring in data-centric storage sensor networks.

BACKGROUND OF THE INVENTION

A sensor network is formed by a collection of tiny sensor nodes. Each sensor node typically includes a sensing device, a processor, and a wireless network interface. With those components, sensor nodes not only sense the surroundings at their neighborhoods independently but also exchange their sensed data and even process data for specific purposes. In order to efficiently store and query the sensed data, data-centric storage (DCS) in the sensor network has been studied.

In the DCS using geographic routing, since each node does not separately compose state information such as a routing table, it is possible to implement an efficient and scalable DOS.

DOS sensor network base on the geographic routing maps information on an event occurring at a specific sensor node to an arbitrary geographic location. The mapping is performed by hashing a name of the event or some attribute representing the event with a hash function such as SHA-1.

The event is stored at the closest neighboring node to the point where the hash value of the event indicates, which is called a rendezvous node. A query node interested in specific event information detects the rendezvous node storing the specific event and directly receives data therein without flooding a query over the entire network so as to find the rendezvous node storing the specific event. Those nodes which attempt to store an event or to query and retrieve a specific event hash a name or attributes of the corresponding event with a hash function, which is shared among network nodes, to discover the location of a rendezvous node including the event. Then, the nodes can send the event or the query to the rendezvous node and thereby to store the event at the rendezvous node or obtain the event from the rendezvous node. At this time, since destination of a packet is represented as geographic location, the packet is sent to a rendezvous node using geographic routing.

Greedy Perimeter Stateless Routing (GPSR) as a typical geographic routing algorithm is used at all of the nodes participating in DOS. All nodes implementing GPSR know geographic locations of themselves and neighborhoods within radio transmission range. GPSR utilizes two forwarding modes, i.e., greedy forwarding mode and perimeter forwarding mode, and performs routing while switching the forwarding modes. Greedy forwarding mode uses a greedy-style forwarding algorithm. When a node has a data packet, it forwards the packet to a neighbor whose position is closest to the destination location. This concept of greedy forwarding mode is illustrated in FIG. 1. On receiving the packet, the neighbor repeats the forwarding procedure. The greedy mode, however, does not always work because a packet possibly encounters a network void at which the forwarding node is the closest node to the destination location among all nodes in its one-hop neighborhood. The node, thus, cannot find a next hope to send the packet. For example, as shown in FIG. 2, a node x does not have a neighboring node which is closer to a destination node D than itself. To recover from that deadlock situation, perimeter forwarding mode is used. Perimeter forwarding mode chooses the next hope according to the right hand rule: the first counterclockwise encountered neighbor is selected as the next hope, which is illustrated in FIG. 3. Perimeter forwarding mode routes the data packet along perimeter of the network void to escape from the deadlock situation at the network void. Greedy forwarding mode is resumed when the packet reaches to a node that is closer to the destination location than the entry node where perimeter forwarding mode starts. If the destination node is disconnected from the source, keeping forwarding packets with perimeter mode makes packets loop at nodes that are closest to the destination locations. In DCS sensor networks, since a destination location of an event is acquired by hashing a name or attributes of the event, and the hashed value may result in "empty" destination locations (location at which there are no nodes residing), disconnection between sources and destinations happen frequently. Consequently, packets frequently loop on perimeters containing destination location and form perimeter walks. FIG. 4 illustrates an example of perimeter walk.

Referring to FIG. 4, a data packet is routed from node S to an empty destination location T. The packet is, firstly, forwarded by greedy mode to node N. At the node N, the packet is switched to perimeter mode since there are no neighbors of N that are closer to T than N. The packet then circumnavigates on the perimeter of face M-N-O-P-Q and finally loops at N. A packet completes a perimeter walk only if it continuously visits every edge of a face with perimeter mode solely. Thus, the perimeter walk completes at node N.

As one property of a perimeter walk is that it always completes at the closest node to the corresponding destination location. If a packet, by perimeter forwarding, arrives at a node closer to the entry node where perimeter forwarding mode starts, the packet will fall back to greedy forwarding mode, and ongoing perimeter walk will be reset. Thus, perimeter walks never complete at nodes that are not closest to the destination location.

Existing geographic routing based DCS schemes utilize perimeter walks for identifying rendezvous nodes, nodes are closest to destination locations. Such perimeter walks, however, can cause considerable communication overhead in geographic routing protocols.

SUMMARY OF THE INVENTION

In view of the above, the present invention provides a method for pruning perimeter walks in data-centric storage (DOS) sensor networks using a pruning algorithm, which is capable of reducing overhead in DOS sensor networks.

In accordance with an aspect of the present invention, there is provided a method for pruning perimeter walks, including:
hashing a name or attributes of an event, when the event occurs, to figure out a destination location of the event;
performing greedy forwarding of geographic routing so as to send a packet of the event towards the destination location;
checking a distance D between the destination location and a current node where a packet transmission using greedy forwarding mode is impossible, when the packet reaches the current node;
checking distances between the destination location and respective neighboring nodes of the current node to obtain a neighboring node having a minimum distance M, when the distance D between the current node and the destination location is same or less than half of radio transmission range;
comparing the minimum distance M to the distance D; and
determining which node is a rendezvous node, according to the comparison result.

BRIEF DESCRIPTION OF THE DRAWINGS

The above features of the present invention will become apparent from the following description of embodiments given in conjunction with the accompanying drawings, in which:

FIG. 6 is a view for describing a method for pruning perimeter walks in accordance with the embodiment of the present invention;

FIG. 7 shows an algorithm for pruning perimeter walks in accordance with the embodiment of the present invention;

DETAILED DESCRIPTION OF THE EMBODIMENTS

Hereinafter, embodiments of the present invention will be described in detail with reference to the accompanying drawings.

Figure 1:
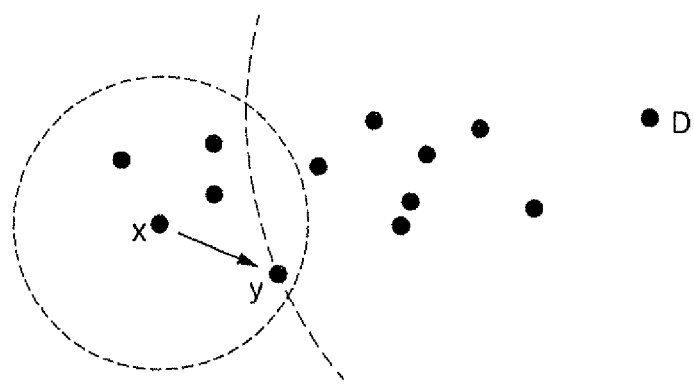
FIG. 1 is a view for describing greedy forwarding mode.
Figure 2:
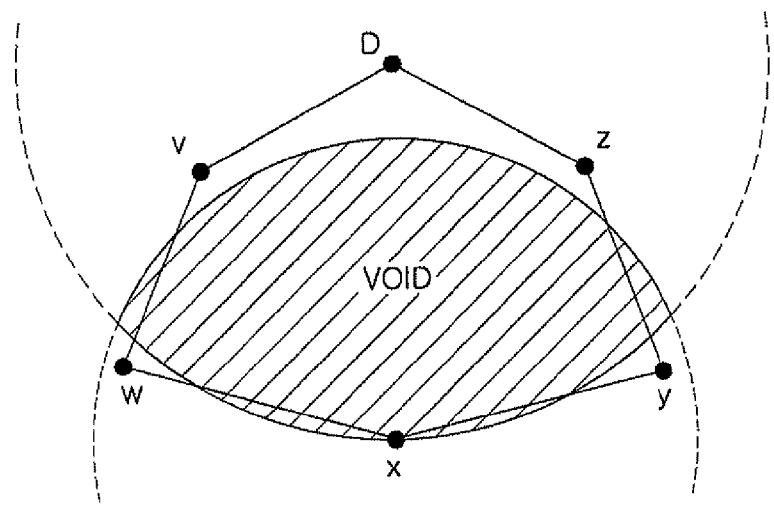
FIG. 2 is a view for describing a precondition for perimeter forwarding mode.
Figure 3:
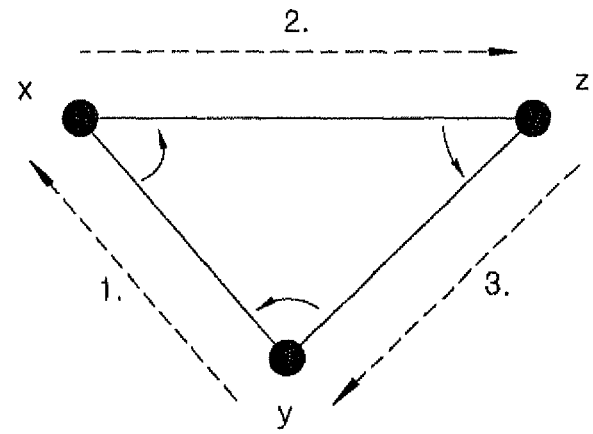
FIG. 3 shows an example of right hand rule of perimeter forwarding mode.
Figure 4:
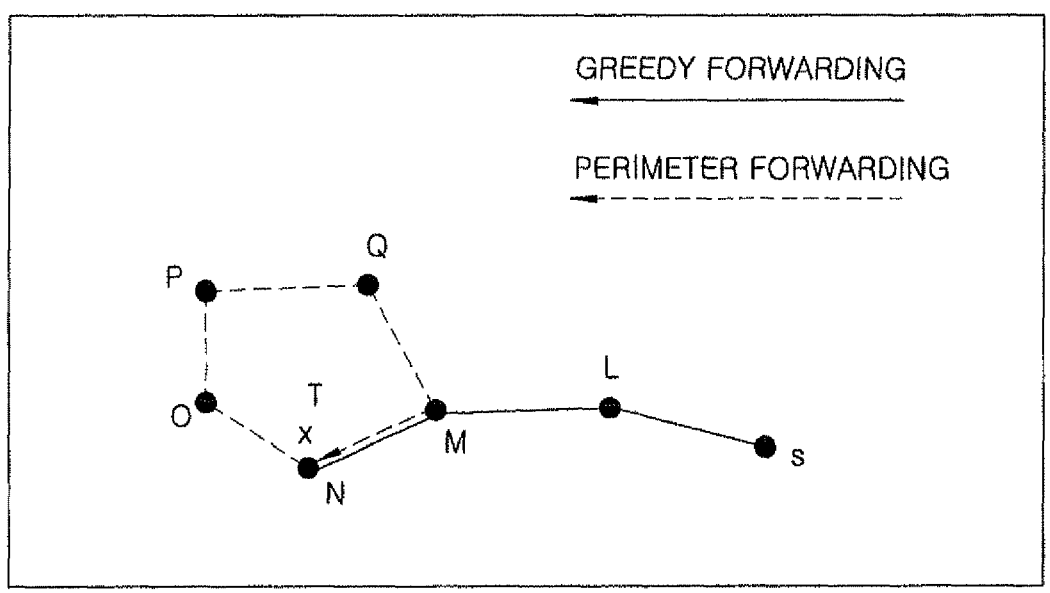
FIG. 4 illustrates an example of perimeter walk.
Figure 5:
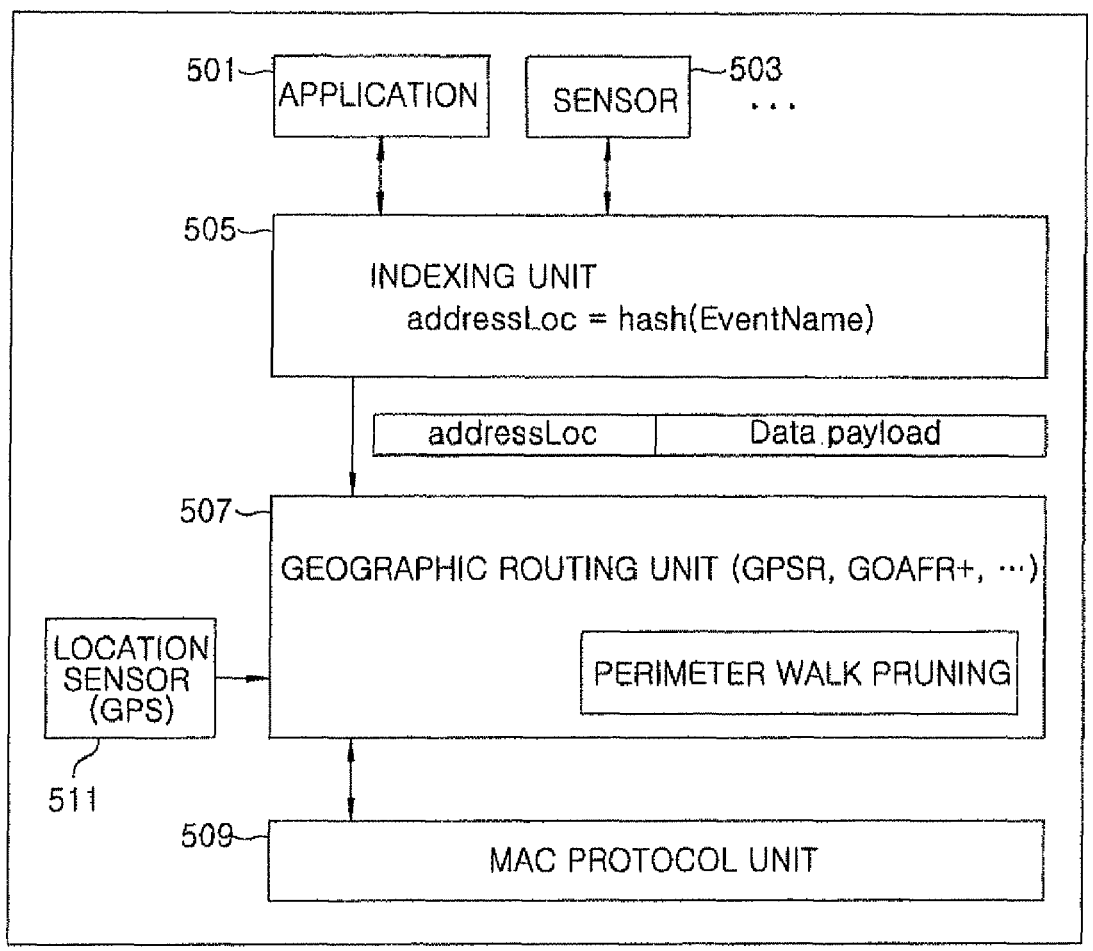
FIG. 5 is a block diagram illustrating architecture of each sensor node, which composes a DOS sensor network and employs a method for pruning perimeter walks, in accordance with an embodiment of the present invention.

FIG. 5 is a block diagram illustrating architecture of each sensor node, which composes a data-centric storage (DOS) sensor network and employs a method for pruning perimeter walks, in accordance with an embodiment of the present invention.

Referring to FIG. 5, a DCS sensor node includes an application 501, a sensor 503, an indexing unit 505, a geographic routing unit 507, and a MAC protocol unit 509. Each of these components in the DOS sensor node includes a processor for operation.

The application 501 generates an event or the sensor 503 senses an event occurrence. The application 501 and the sensor 503 use a key of the generated or sensed event as a parameter to make GET or PUT request. The key of the event can be its name or some attribute representing the event. The application 501 and the sensor 503 receive or send the event using GET or PUT interface.

Indexing unit 505 hashes the key of the event to generate hash value, when a GET or PUT request is received from the applications 501 or the sensor 503. In the drawing, the key is a name of the event (EventName). The hash value directly indicates an address (addressLoc) where the event has been stored or will be stored, i.e., a destination location. The address (addressLoc) is provided, together with a packet (Data payload) of the event storing information on the event, to a geographic routing unit 507.

The geographic routing unit 507 implements an algorithm to deliver the packet (Data payload) to a destination location indicated by the address (addressLoc). In this embodiment, the algorithm is implemented to be capable of pruning perimeter walks. The geographic routing unit 507 determines to which node the packet (Data payload) is sent among neighboring nodes, and requests transmission via network interface. The determination may be made by GPSR and a proposed algorithm. The sensor node needs to know geographic position of its neighboring nodes for the determination. Thus, the geographic routing unit 507 of each sensor node may have a location sensor 511 such as GPS (Global Positioning System) and informs neighboring nodes of its location. All information described above is specified in protocol.

MAC protocol unit 509 corresponds to a radio communication interface and transmits packets between nodes. That is, MAC protocol unit 509 takes charge in data transmission between actual nodes according to the algorithm for determining forwarding node implemented by the geographic routing unit 507.

FIG. 6 is a view for describing a method for pruning perimeter walks in accordance with the embodiment of the present invention and illustrates the situation where pruning is possible.

Referring to FIG. 6, it is assumed that a network node i that is participating in a routing process of a query (or insertion) message. A perimeter walk of the message is pruned if i, without sending a message, can detect that it is closest to the destination location T. In general situations, i cannot know that it is closer to the destination location T than any other nodes in the network. However, if i is sufficiently close to T, nodes that are not neighbors of i cannot be closer to T than i. If it is the case, by checking its neighbor, i can know whether it is the rendezvous node or not. Basically, since neighboring nodes exchange location information between each other for GPSR routing, i can prune perimeter walks with no cost.

The threshold at which nodes can prune perimeter walk is defined as R/2, as shown in theorem 1 below.

[Theorem 1]

If Euclidean distance from a destination location T to a node i is less than R/2, i or one of i's neighbors is the rendezvous node of T, wherein R is radio transmission range.

The theorem 1 may be proved as follows:

Denote $\delta(M,N)$ is the Euclidean distance between two locations (or nodes) M and N. If j is not a neighboring node of i, it is shown that j cannot be the rendezvous node of T (see FIG. 6). Since j is not a neighbor of i, $\delta(i,j) > R$. And since i is closer to T than R/2, $\delta(i,T) < R/2$. According to triangular inequality, $\delta(j,T) \geq \delta(i,j) - \delta(i,T)$. This leads to $\delta(j,T) \geq R - R/2 = R/2$ and $\delta(j,T) \geq \delta(i,T)$. Thus, j cannot be the rendezvous node of T since j is farther from T than i.

In other words, it is proved that if a distance from a node to a destination location is within a half of radio transmission range (R/2), only the node or its neighboring node can be a rendezvous node. Based on this proof, when an event or a query packet arrives at a node where greedy forwarding mode cannot be applied anymore, if a distance from the node to a destination location is less than R/2, it is reasonable that the node or one of its neighboring nodes is the closest node to the destination location, i.e., a rendezvous node. Thus, perimeter walks is not performed and routing ends.

The theorem 1 directly suggests an algorithm, called PWP (perimeter walk pruning protocol), for pruning perimeter walks in accordance with the embodiment of the present invention, which is shown in FIG. 7.

Figure 8:
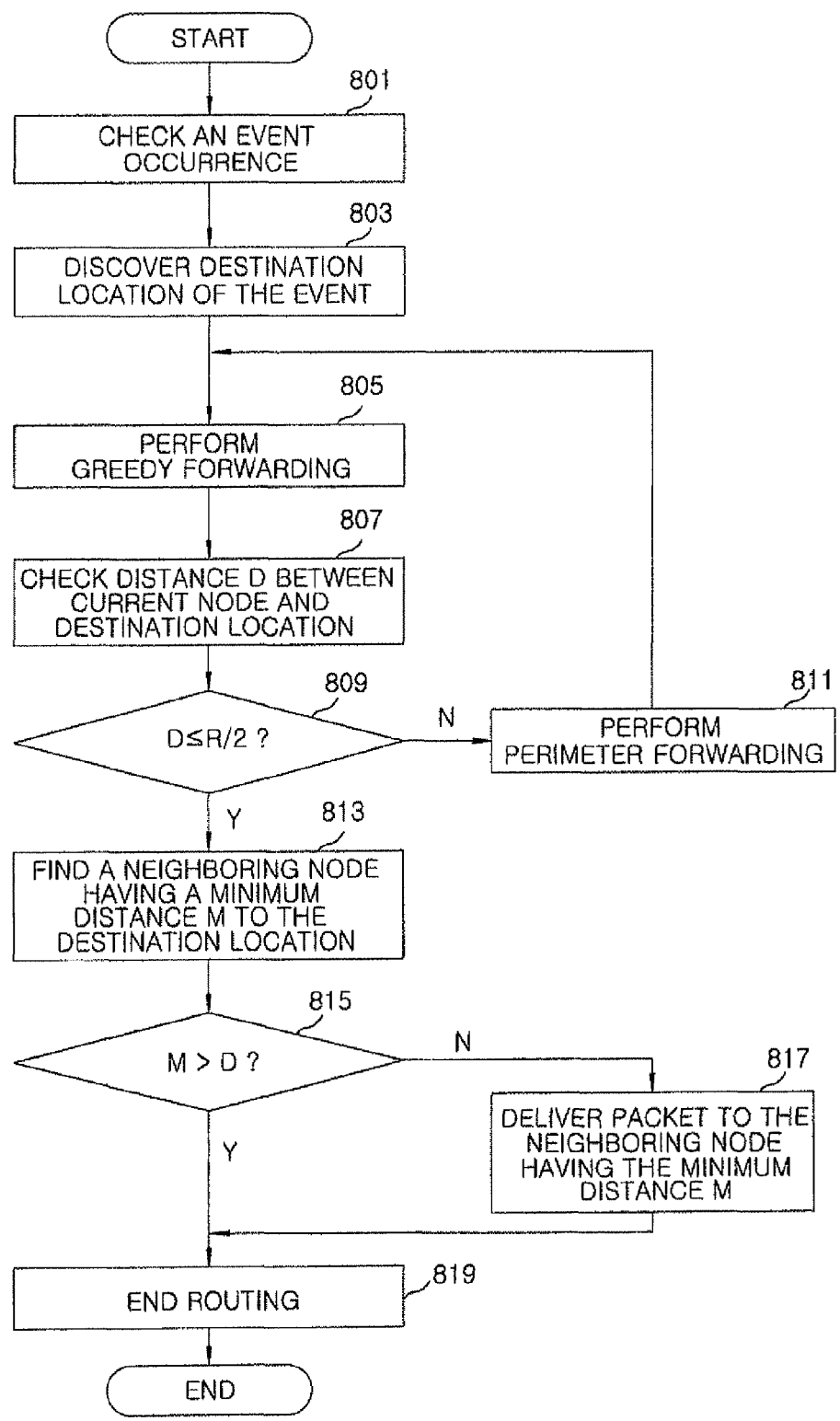
FIG. 8 shows a flowchart illustrating a method for pruning perimeter walks in accordance with the embodiment of the present invention.

FIG. 8 shows a flowchart illustrating a method for pruning perimeter walks in accordance with the embodiment of the present invention.

When an event for storage or query occurs in step S801, a name or attributes of the event is hashed using hash function such as SHA-1 to figure out a destination location of the event in step S803. Then, a greedy forwarding of geographic routing is first performed in step S805 so as to send a packet of the event towards the destination location. While routing, when a packet reaches a node where a packet transmission using greedy forwarding mode is impossible, that is, a packet reaches a node having no neighbors in a radio transmission range R, a distance D between the current node i and the destination location is checked in step S807. As the check result, if the distance D between the current node and the destination location is same or less than R/2 in step S809, distances to the destination location are computed regarding all neighboring nodes of the current node to obtain a neighboring node having a minimum distance M there among in step S813. Subsequently, the minimum distance M of one neighboring node is compared to the distance D between the current node where the packet resides and the destination location in step S815. If the minimum distance M is bigger than the distance D, which means the current node is the closest node to the destination location, the routing ends to prune a perimeter walk in step S819. If the minimum distance M is less than the distance D, the packet is delivered to the neighboring node having the minimum distance M to the destination location in step S817, and then routing ends in step S819.

As the check result, however, if the distance D between the current node and the destination location is bigger than R/2 in step S809, perimeter forwarding of geographic routing is performed in step S811. Thereafter, perimeter forwarding is switched into greedy forwarding in step S805 when a packet reaches a node which is closer to the destination location than the current node, repeats the step S805 to S809.

Hereinafter, simulation results using ns2 network simulator will be described to evaluate the performance of PWP with reference to FIGS. 9 to 10. For this purpose, geographic hash table (GHT) is compared to GHT-PWP in which GHT is applied by the pruning algorithm.

Figure 9:
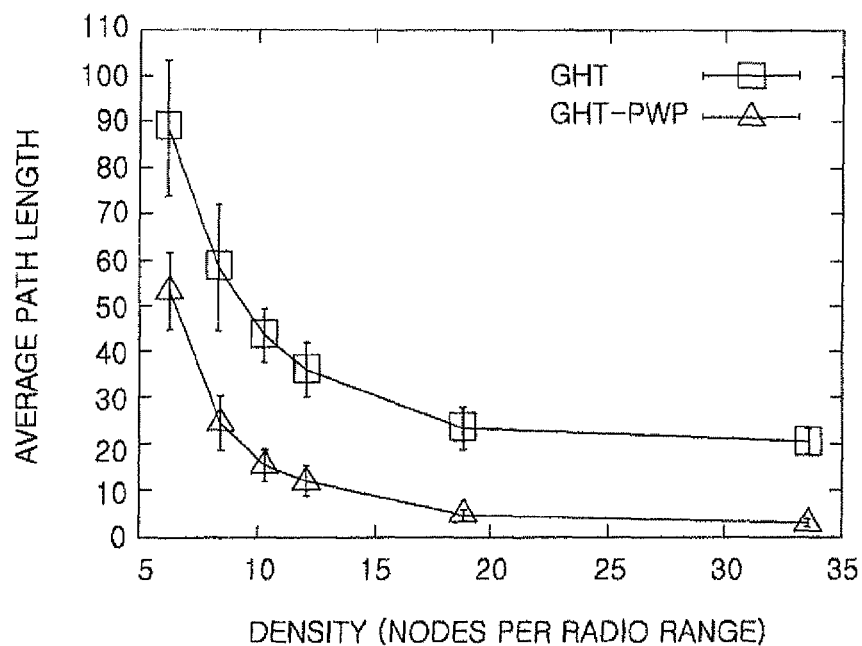
FIG. 9 illustrates a comparison result between PWP and GHT in terms of path length.

FIG. 9 shows a comparison result between GHT-PWP and GHT in terms of path length. Herein, the path length refers to an average count of an average hop. The path length is proportional to network overhead. That is, the bigger path length is, the more network overhead occurs Referring to FIG. 9, it is seen that the pruning algorithm, PWP, greatly reduces the average path length. Reductions from 90 hops to 53 hops (when $n_0 \approx 6$) and from 21 hops to 3 hops ($n_0 \approx 33$) are observed. This represents that traffic overhead of GHT can be reduced from 44% to 85% by pruning perimeter walks.

Figure 10:
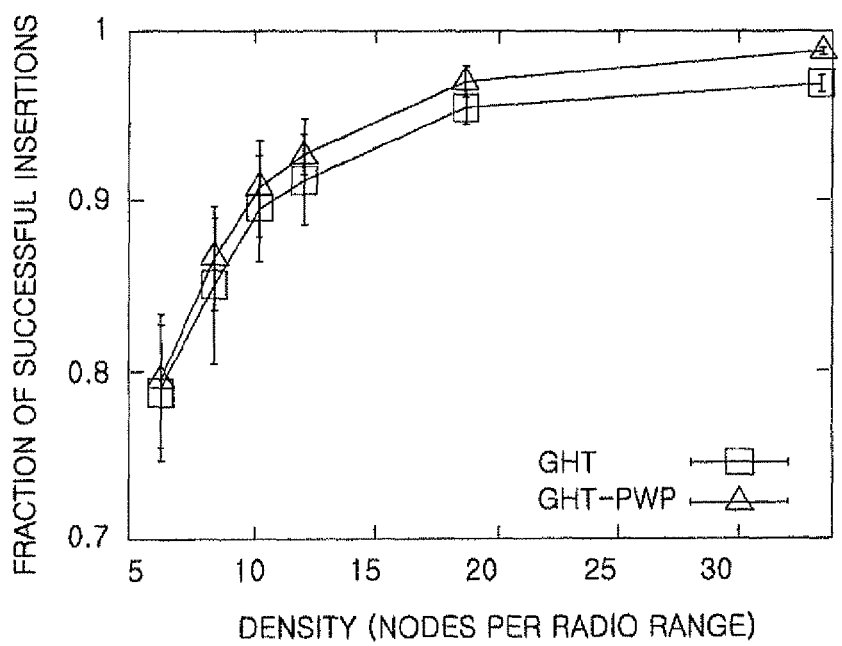
FIG. 10 illustrates a comparison result between PWP and GHT in terms of a success rate of insertions.

FIG. 10 shows a comparison result between GHT-PWP and GHT in terms of a success rate of insertions.

Referring to FIG. 10, it is seen that the success rate of insertions increases, as entire overhead of the network is reduced. This is because higher amount of traffics existing in the network increases collision during radio transmission causing more pack drops. GHT-PWP has slightly higher success rate than GHT. This explains that overhead in GHT-PWP is lower than that in GHT.

As described above, the present invention proposes a method for pruning perimeter walks in DOS sensor networks using only transmission range information, without having additional communication overhead used in an existing GPSR, thereby considerably reducing overhead in DOS sensor networks. Thus, the performance of the DOS sensor networks is improved.

While the invention has been shown and described with respect to the embodiments, it will be understood by those skilled in the art that various changes and modification may be made without departing from the scope of the invention as defined in the following claims.

What is claimed is:

1. A method for pruning perimeter walks, comprising:
   hashing a name or attributes of an event, when the event occurs, to figure out a destination location of the event;
   performing, by a geographic routing unit, greedy forwarding of geographic routing so as to send a packet of the event towards the destination location;
   checking a distance D between the destination location and a current node where a packet transmission using greedy forwarding mode is impossible, when the packet reaches the current node;
   checking distances between the destination location and respective neighboring nodes of the current node to obtain a neighboring node having a minimum distance M, when the distance D between the current node and the destination location is same or less than half of radio transmission range;
   comparing the minimum distance M to the distance D; and
   determining which node is a rendezvous node, according to the comparison result.

2. The method of claim 1, further comprising:
   performing perimeter forwarding, when the distance D between the current node and the destination location is bigger than half of the radio transmission range.

3. The method of claim 2, wherein the perimeter forwarding is switched to the greedy forwarding, when the packet reaches a node which is closer to the destination location than the current node.

4. The method of claim 1, wherein as the comparison result, if minimum distance M is bigger than the distance D, the current node is determined as the rendezvous node and the geographic routing ends.

5. The method of claim 1, wherein as the comparison result, if minimum distance M is less than the distance D, the packet is delivered to the neighboring node having the minimum distance M.

6. The method of claim 5, wherein the neighboring node having the minimum distance M is determined as the rendezvous node and the geographic routing ends.

7. The method of claim 1, wherein the current node, where the packet transmission using greedy forwarding mode is impossible, indicates a node having no neighbors in the radio transmission range.

* * * * *